Patented Apr. 26, 1927.

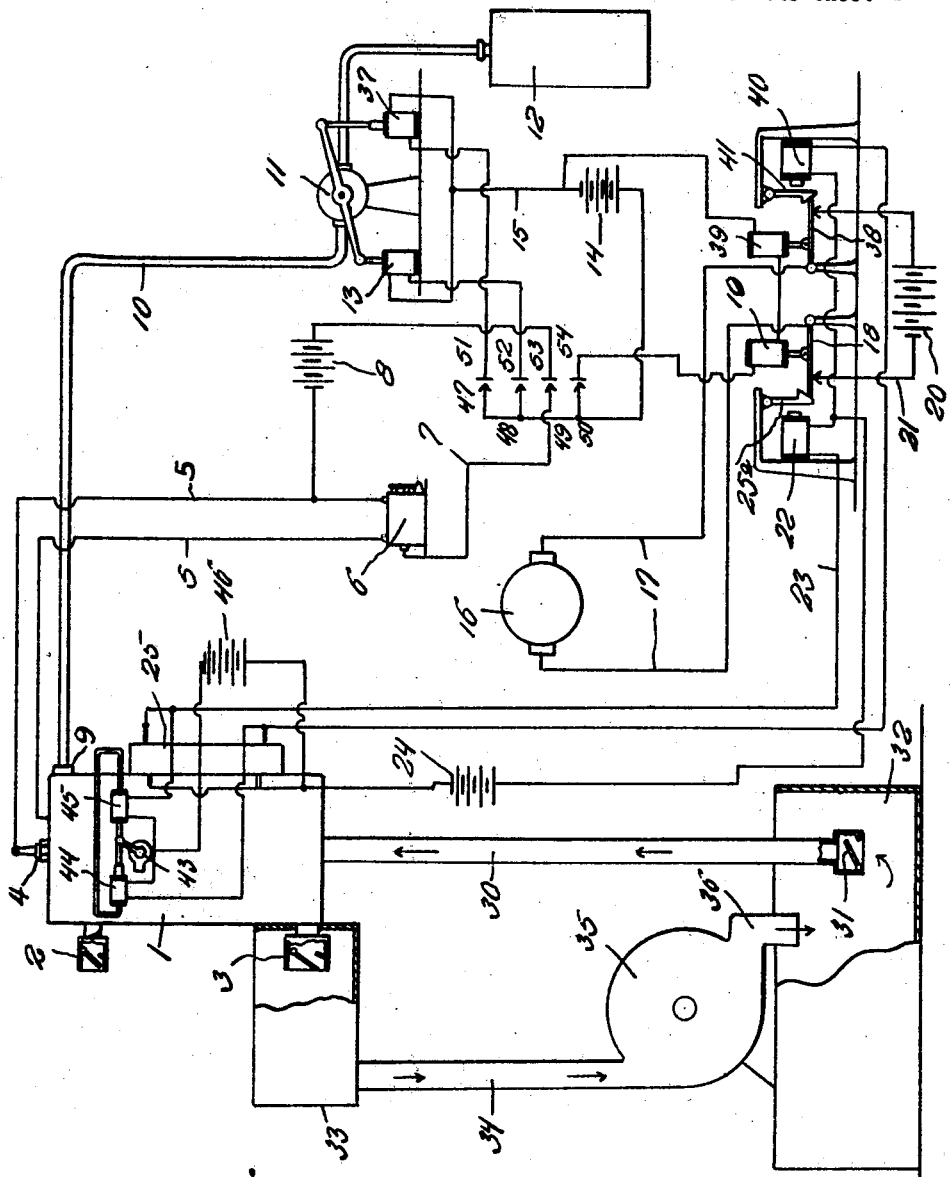

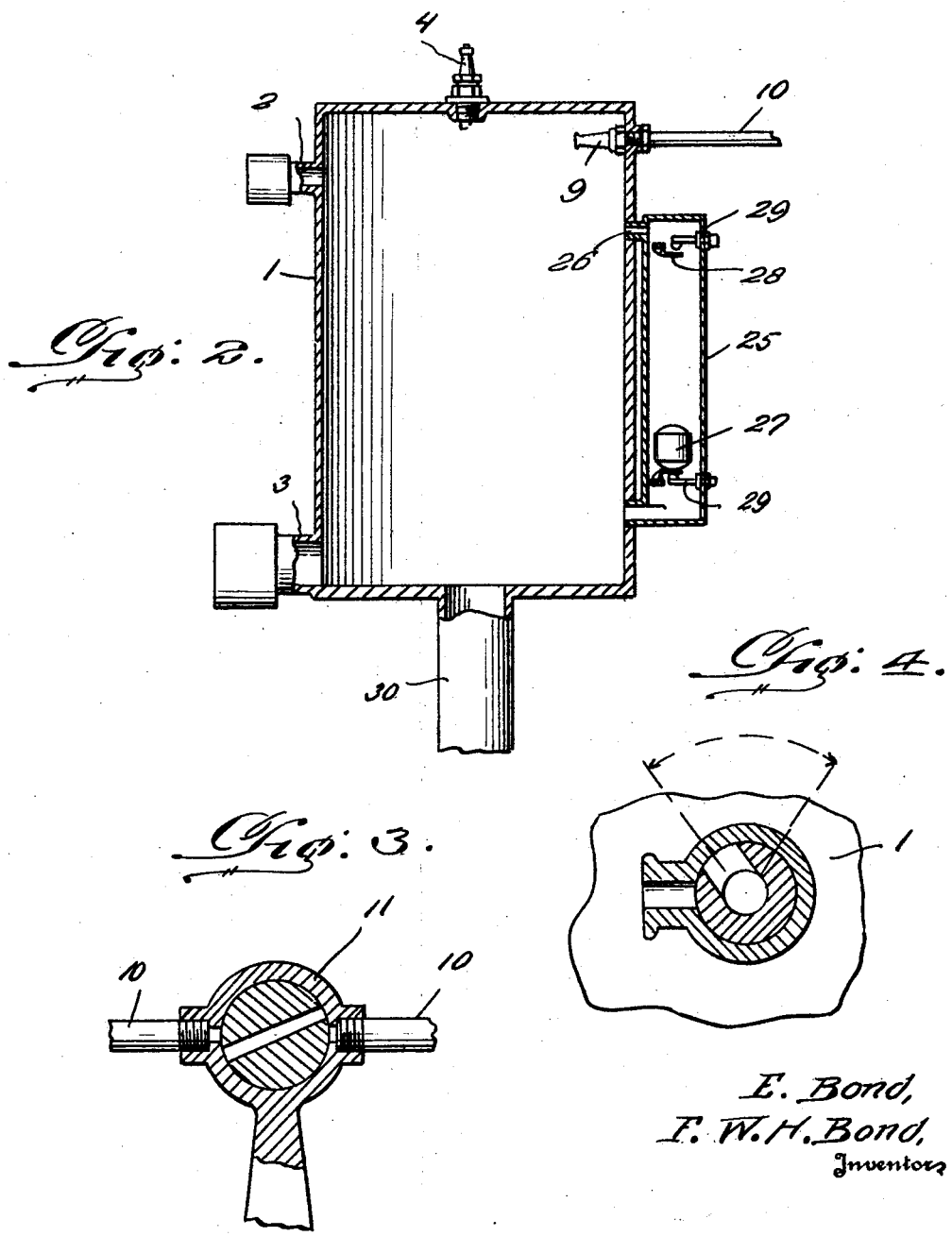

1,626,070

UNITED STATES PATENT OFFICE.

EDWARD BOND AND FREDERICK W. H. BOND, OF VANCOUVER, WASHINGTON.

VACUUM PUMP AND POWER PLANT.

Application filed January 13, 1925. Serial No. 2,099.

This invention relates to means for raising water within prescribed limits, and utilizing the water in a manner to produce power for operating machinery.

The invention also has reference to a structure capable of permitting the foregoing result to be obtained, the structure being such as to permit it to be utilized for pumping water, which may be used for irrigation and drainage purposes.

More specifically, the invention relates to an improved apparatus for the purpose specified, wherein the same embodies a tank, into which a predetermined quantity of carbide gas is fed at intervals, the gas being exploded in the tank, for producing a vacuum. Connected to the tank is a water elevating pipe, through which a column of water is lifted under the influence of the vacuum, the water being temporarily trapped in the tank, after which the vacuum is automatically released, to permit the water to flow from the tank downwardly to a conduit, which is connected with a fluid motor driven by the downwardly flowing water to permit power to be taken from the shaft of the motor.

The structural advantages of this feature will become apparent from the following description and drawings.

In the accompanying drawings, forming a part of this application, and in which like numerals are employed to designate like parts throughout the same:

Figure 1 is a diagrammatic view, partly in section, and partly in elevation, of the complete power plant.

Figure 2 is a vertical sectional view of the so-called explosion and vacuum tank, forming a part of the apparatus.

Figure 3 is a detail sectional view of a valve used for controlling the admission of an explosive charge to the tank.

Figure 4 is also a detail sectional view, showing a valve, such as is used for controlling the admission of air to the tank.

Referring to the drawings in detail, it will be seen that the tank, which I conveniently designate as the explosion tank, is generally indicated by the reference character 1. This tank is provided, in the vicinity of its top and bottom, with nipples 2 and 3, provided with outwardly opening check valves. The upper valved nipple functions as a pressure release valve. As will be seen later, the lower nipple forms a fluid discharge for the tank. A spark plug 4 is fitted in the upper wall of the tank, and is electrically connected, by means of wiring 5, with a coil 6. The coil 6 is, in turn, electrically connected, by means of wiring 7, with a battery or generator 8. Leading through the side wall of the tank, adjacent the top thereof is a nozzle 9 connected to one end of a gas supply pipe 10. Located in the pipe 10, at a suitable point, is a gas control valve 11, the same being disposed in proximity to a gas supply container 12, with which the adjacent end of the supply pipe is connected. The valve 11 is electrically controlled through the medium of a pair of solenoids 13 and 37, which are electrically connected by means of conducting wires 15, with a battery or generator 14. A motor, 16, is electrically connected by means of wires 17, with switches 18 and 38, which in turn are connected with solenoids 19 and 39, also electrically connected with the aforesaid wiring 15. A battery 20 is connected, through the medium of wires 21, with the switches 18 and 38. Magnets 22 and 40 are located adjacent the free ends of the switches and are connected in open circuit, by means of wiring 23, with a battery or its equivalent 24. Hooks 25ᵃ are located in the magnetic field of the magnet 22 and 40, and are arranged to engage under the free ends of the switches 18 and 38, when the solenoids 19 and 39 are energized, to thereby break the electric connection between the switches and the wiring 21, to the battery 20.

A cylinder 25 (see Figure 2), is located at one side of the tank 1, and communicates with the interior thereof, by small necks 26, at its top and bottom. This cylinder constitutes a chamber and a float 27 is mounted for vertical reciprocation within this chamber. Flexible terminals 28 located in the chamber in the path of movement of the float, and are connected in the wiring 23, which is connected in turn with the battery 24. Terminals 29 are also located in the chamber and in the path of movement of the flexible terminals 28. The terminals 29 are connected in the wiring 23. A pipe 30 is connected to the bottom of the tank 1, and communicates with the interior thereof, this pipe being provided at its lower end with a check valve 31, which is positioned in a water supply reservoir 32. The aforesaid check valve 3 is housed within a casing 33, and a pipe 34 communicates with the interior of the casing, through the bottom thereof, and with a turbine motor housing 35, which is supported upon the reservoir 32. The motor housing is provided with an outlet 36, arranged to discharge water into the reservoir 32.

When using the device, for producing power, the reservoir 32 is first filled with water. Then, a predetermined amount of gas is allowed to enter the combustion chamber or tank 1, the gas being exploded by the spark plug, in the obvious manner. When the explosion takes place, a vacuum is produced within the tank. A column of water is drawn upwardly through the valve 31 and ascends the pipe 30 into the tank 1, under the influence of the vacuum created therein. As the water rises in the tank, the float 27 moves upwardly in the cylinder 25, until it comes into contact with the flexible terminal 28, at this point. This closes the circuit to the solenoid 45, found on one side of the tank. The circuit including the magnet 22 is closed, and the magnet energized, thus releasing the hook 25ª, which, in turn, releases the switch arm 18. At approximately the same instant, the solenoid 45 is energized, and the adjacent air valve 43 is opened, thus destroying the vacuum in tank 1, and allowing the water in the same to rush outwardly through the valved nipple 3, into the casing 33. The water then descends the pipe 34, and enters the housing of the water turbine 35, acting on the rotor in this turbine, to drive the shaft, upon which it is mounted, the power being taken up from this shaft, in any appropriate way. The water passing through the housing of the rotor is discharged through the outlet 36, into the reservoir 32. As the water descends in the tank 1, the float 27 also descends in the cylinder 25, until it comes in contact with the flexible terminal 28 at the bottom, pressing the same against the terminal 29 and closing the circuit to solenoid 44, and magnet 40.

This operation energizes the solenoid 44, and closes the air valve 43; at the same time releasing the hook 41, which, in turn, releases the switch arm 38. This operation closes the circuit from storage battery 20 through wires 21 and 17 to electric motor 16.

The motor 16 is geared to a cam shaft (not shown), the cams of which press flexible and movable contacts 47, 48, 49 and 50, against rigid contacts 51, 52, 53, and 54, at predetermined intervals. As contact 47 is placed against the complemental stationary contact 51, it energizes the solenoid 37, which opens valve 11, thus allowing gas to flow from the container 12, through valve 11, pipe 10, and into the tank 1, as the circuit is broken between contacts 47 and 51. Contact points 48 and 52 are now brought into play, energizing solenoid 13, which closes the gas control valve 11. Following this operation of the contacts 48 and 52, the contact points 49 and 53 are brought into place, and at this time current flows from the battery 8, to the spark coil 6, through the wiring 5 and spark plug 4, thus firing the fuel charge of gas in the tank 1 which creates a vacuum to raise water in predetermined amounts. As the contacts 49 and 53 are released, the contacts 50 and 54 are actuated, thus energizing solenoids 19 and 39, and raising switch arms 18 and 38 to be engaged with the hooks 25ª and 41. This operation stops the electric motor. Contact points 50 and 54 are opened by the momentum of the motor. As the water descends in the tank 1, the float 27 also descends in the cylinder 25, again coming into contact with the contact point 29, at the bottom. This automatically repeats the operation just described. To prevent possible damage, the aforesaid valve 2 acts as a release valve to accommodate an excessive charge of gas.

It is thought that the foregoing description, when taken in connection with the accompanying drawings, will enable persons skilled in the art to which the invention relates, to obtain a clear understanding of the same. For this reason, a more lengthy description of the invention is thought unnecessary.

Although I have shown and described the preferred embodiment of the invention, and have limited the description more or less to the method of operation of the device, for producing power, I wish it to be understood that with the arrangement specified, the same general principal can be used for pumping water for irrigating and drainage purposes, the water being lifted from the source, in the manner specified, and conveyed by appropriate means to any suitable source of deposit. It is also to be understood that any changes coming within the field of invention claimed may be resorted to, if desired.

Having thus described the invention, what is claimed is:

1. In a structure of the class ascribed, a tank in which a predetermined of quantity of explosive mixture is adapted to be contained, said tank being provided with a valved discharge and at its top with an electrically operated pressure release valve, a cylinder on one side of the tank in communication therewith, successively operable contact means for the upper and lower ends of said cylinder, electrically operated valve means for controlling the mixture delivered to the tank, and a float operable in said cylinder for acting on the contact for closing electric circuits, one of said electric circuits including the electrically operated pressure release valve and the other electric circuit including the electrically operated valved means.

2. In combination, a tank having a gas supply, a valved discharge, and a pressure release valve, an ignition means on said tank, electrically operated means cooperating said gas supply, to said tank, and an electrically operated timing mechanism for controlling the operation of the ignition means gas supply to the tank in a predetermined manner, and means for controlling the operation of said timing mechanism.

3. In combination, a tank having a gas supply, a valved discharge, and a pressure release valve, an ignition means on said tank, electrically operated means for controlling the supply of gas to said tank, an electrically operated timing mechanism for controlling the operation of the ignition means and gas supply in a predetermined manner, electrical operating means for said release valve, and means for controlling the operation of the timing mechanism and the electrical means operating said release valve in a predetermined manner.

4. In combination, a tank having a gas supply, a valved discharge and a pressure release valve, an ignition means on said tank, electrically operated means controlling said gas supply, electrically operated means controlling said release valve, electrically operated mechanism for controlling the operation of the ignition means and the gas supply to said tank in a predetermined manner, independent means for controlling the operatical operation of the timing mechanism, and means controlled by the operation of said tank to control said timing mechanism.

In testimony whereof we affix our signatures.

EDWARD BOND.
FREDERICK W. H. BOND.